April 7, 1959  D. J. BRAND ET AL  2,881,103
MANUFACTURE OF SEMI-CONDUCTOR DEVICES
Filed Dec. 17, 1956
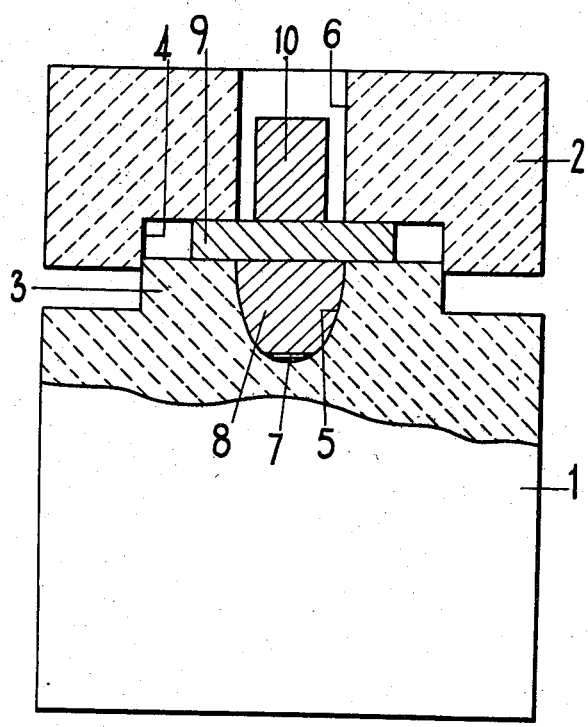
INVENTORS
DENIS JOHN BRAND
JOHN EWELS
BY
ATTORNEYS

United States Patent Office 2,881,103
Patented Apr. 7, 1959

2,881,103

MANUFACTURE OF SEMI-CONDUCTOR DEVICES

Denis John Brand, Hounslow, and John Ewels, Harrow, England, assignors to The General Electric Company Limited, London, England Application December 17, 1956, Serial No. 628,784

Claims priority, application Great Britain December 19, 1955

3 Claims. (Cl. 148—1.5)

This invention relates to the manufacture of semiconductor devices.

One known method of forming an electrode in the manufacture of a semiconductor device comprises the steps of producing in contact with a solid body of a semiconductor a molten metallic material which dissolves part of the semiconductor body and which consists at least partly of a substance capable of acting in the semiconductor as a significant impurity (that is to say a donor impurity or an acceptor impurity), and subsequently solidifying the molten material in such a manner that a solid layer of the semiconductor containing said substance is deposited contiguous with the remainder of the semiconductor body from the molten material.

Where the semiconductor is silicon, the molten material may conveniently be tin containing the desired impurity. In this case, however, difficulties have been encountered where it is desired to use an acceptor impurity, for example where it is required to form a rectifying electrode on N-type silicon. In particular, attempts to produce such an electrode by melting a tin-aluminium alloy on the surface of an N-type silicon body have been unsuccessful; in such cases the aluminium tends to separate from the tin on melting and impairs the wetting properties of the tin.

The present invention overcomes these difficulties by providing a method of forming an electrode in the manufacture of a semiconductor device, comprising the steps of melting tin in contact with a solid body of silicon and with a small quantity of a material which consists at least partly of aluminium and which contains no appreciable amount of any element other than aluminium, silicon and tin, and subsequently solidifying the molten tin, after it has dissolved said material and part of said body, in such a manner that a layer of solid silicon containing aluminium is deposited contiguous with the remainder of the body from the molten tin.

One arrangement in accordance with the invention will now be described by way of example with reference to the accompanying drawing, which is a sectional view of a jig used in the manufacture of a silicon rectifier.

Referring to the drawing, the jig consists of two circular cylindrical parts 1 and 2 formed of steatite and each having a diameter of five millimetres, the part 1 having a length of about four millimetres and having projecting from one end a centrally disposed circular boss 3 of diameter just under three millimetres and length 0.5 millimetre, and the part 2 having a length of two millimetres and being provided at one end with a centrally disposed circular recess 4 having dimensions substantially the same as those of the boss 3. The part 1 is provided with a tapered recess 5 of circular cross-section extending inwards from the end face of the boss 3, the recess 5 having a diameter at its mouth of one millimetre and a depth of one millimetre, and the part 2 is provided with an axial hole 6 of diameter one millimetre.

In the manufacture of a rectifier, the part 1 is disposed with the boss 3 uppermost, and a pellet 7 consisting of about 60 micrograms of the eutectic aluminium-silicon alloy is placed in the recess 5. A petllet 8 of spectroscopically pure tin is then pressed into the recess 5, any surplus tin being cut off flush with the upper surface of the boss 3 by means of a sharp blade; the mass of tin then contained in the recess 5 is approximately 2.5 milligrams. A wafer 9 of N-type silicon having a resistivity of about two ohm centimetres is then placed on top of the boss 3 with one main face in contact with the upper face of the boss 3, the wafer 9 having main faces two millimetres square and having a thickness of 0.4 millimetre, and having previously been cleaned by chemical etching. The part 2 of the jig is then fitted over the top of the part 1, the silicon wafer 9 being held in place by being disposed in the recess 4. A pellet 10 of about three milligrams of commercially pure tin, which contains about 0.01% of antimony as an incidental impurity, is then placed in the hole 6 so as to be in contact with the upper main face of the silicon wafer 9.

About twenty jigs loaded as described above are mounted in a refractory boat which is then pulled through a furnace in an atmosphere of dry hydrogen. The temperature at the centre of the furnace is about 1100° C. and the boat is moved so that it takes ten minutes to reach the central hot zone, three minutes to pass through the hot zone, and ten minutes to reach the exit from the furnace. The boat and jigs then take a further ten minutes to cool to room temperature. During the heating operation, the tin 8 in the recess 5 in each jig melts and dissolves the aluminium-silicon alloy 7; the molten tin also dissolves part of the silicon wafer 9 so as to form a shallow pit extending into the wafer 9 from its lower main face. During the cooling the molten material in the recess 5 in each jig resolidifies, the initial solidification being such that a thin layer of silicon containing aluminium, and therefore of P-type conductivity, recrystallises in the pit in the silicon wafer 9, the remainder of the molten material solidifying in the form of a bead which is mainly composed of tin and can therefore be utilised to provide an ohmic connection to the layer of P-type silicon. Also during the furnacing operation, the pellet of tin 10 in each jig is fused to the upper main face of the silicon wafer 9 to form a second bead which is in good ohmic contact with the N-type silicon.

Each silicon wafer with the beads attached is removed from its jig, and manufacture of the rectifier utilising the wafer is completed in conventional manner. In particular, the subsequent stages of the manufacture involve etching the wafer (for example in a solution consisting of five parts of 70% nitric acid and three parts of 40% hydrofluoric acid) in order to remove surface contamination, and encapsulating the wafer in a hermetically sealed envelope provided with means for making separate-electrical connections to the two beads.

While it is preferred to introduce the aluminium in a method in accordance with the invention in the form of an aluminium-silicon alloy, as in the specific arrangement described above, it would be possible to replace the aluminium-silicon alloy by aluminium itself, or by an aluminium-tin or an aluminium-silicon-tin alloy.

We claim:

1. A method of forming an electrode in the manufacture of a semiconductor device, comprising the steps of first melting tin in contact with a solid body of silicon and simultaneously in contact with a small quantity of a material which consists at least partly of aluminium and which contains no appreciable amount of any element other than aluminium, silicon and tin, and subsequently solidifying the molten tin after it has dissolved said material and part of said body, whereby a layer of solid silicon containing aluminium is deposited contiguous with the remainder of the body from the molten tin.

2. A method according to claim 1, in which said material is an aluminium-silicon alloy.

3. A method according to claim 2, in which said alloy is the eutectic alloy.

References Cited in the file of this patent

UNITED STATES PATENTS

| | | |
|---|---|---|
| 2,705,768 | Kleimack et al. | Apr. 5, 1955 |
| 2,736,847 | Barnes | Feb. 28, 1956 |
| 2,742,383 | Barnes et al. | Apr. 17, 1956 |
| 2,776,920 | Dunlap | Jan. 8, 1957 |
| 2,781,481 | Armstrong | Feb. 12, 1957 |
| 2,785,095 | Pankove | Mar. 12, 1957 |